Aug. 5, 1969 NOBUO SENSUI ET AL 3,459,279
APPARATUS FOR OILING CONTINUOUSLY MOVING BODIES
Filed Feb. 1, 1966 3 Sheets-Sheet 1

United States Patent Office 3,459,279
Patented Aug. 5, 1969

3,459,279
APPARATUS FOR OILING CONTINUOUSLY MOVING BODIES
Nobuo Sensui and Tohei Honami, Yokohama-shi, Japan, assignors to Shibaura Kyodo Kogyo Kabushiki Kaisha, Kawasaki-shi, Kanagawa-ken, Japan, a joint-stock company of Japan
Filed Feb. 1, 1966, Ser. No. 524,286
Claims priority, application Japan, Feb. 3, 1965, 40/5,511; Mar. 5, 1965, 40/16,922; Oct. 14, 1965, 40/63,046
Int. Cl. F16n 9/04; F16f 15/12
U.S. Cl. 184—15                                   4 Claims

ABSTRACT OF THE DISCLOSURE

Apparatus for oiling continuously moving mechanism having a swing lever of a parallelogram mechanism disposed substantially in parallel with and close to the path of movement or travel of continuously moving bodies to be oiled and an oiling mechanism and a piston cylinder assembly adapted to actuate a guide member are supported by the swinging lever. The guide member is advanced to the path of travel and engaged by the traveling bodies or elements thus moving the swinging lever in synchronism with the traveling bodies. During this movement the oiling mechanism is operated to perform oiling. When the parallelogram mechanism reaches the end of its forward stroke the guide member is retracted and the parallelogram mechanism is restored to the original position in which the guide member is again advanced to commence the new cycle.

---

This invention relates to an apparatus for supplying a predetermined definite quantity of lubricant to each of continuously moving bodies such as rollers of a conveyor chain.

Chain conveyors of various type and capacity are now widely utilized in various manufacturing factories. For example, conveyors utilized in steel mill plants are required to carry ingots and slabs at high temperatures and weighing about 10 to 20 tons. The length of a chain conveyor installed in motor car assembling factories sometimes amounts to about 500 meters, thus requiring a chain of a total length of more than 1,000 meters, and the number of guide rollers utilized in such a long chain is numerous. For example, the total number of guide rollers or oiling nipples provided therefor of chain conveyors installed in an assembling line of a motor car manufacturing plant amounts to about 7,000, and when it is assumed that lubricant is to be supplied to each of said oiling nipples once each week, it takes about two days for oiling all nipples. Moreover, since such chain conveyors are running at a considerable speed, say, for example, 16 meters per minute, it is very difficult to accurately supply lubricant of a predetermined quantity by manual operation when conveyors are running at such a high speed.

Accordingly, many types of automatic oiling apparatus for such applications have been developed but they are not always satisfactory.

According to one previous automatic oiling apparatus, approach of the oiling nipple to the oiling station is sensed by an electrical or pneumatic means, and the oiling mechanism is started to advance toward the nipple in response to a signal from said sensing means. Concurrently therewith, an air cylinder is actuated to move the oiling mechanism in parallel with the oiling nipple in the same direction and at the same speed as the nipple. However, it is difficult to accurately align the oiling mechanism and the nipple when they engage each other and to maintain synchronism between the speeds of the nipple and the oiling mechanism. As a result, either one or both of said oiling mechanism, particularly the oiling nozzle thereof, and the nipple are damaged, and leakage of the lubricant is unavoidable.

In another oiling device, the oiling mechanism is mounted on a pivoted bar to be advanced to and retracted from the oiling nipple and oiling is performed during the arcuate movement of the pivoted bar, so that the angle of contact between the oiling nozzle of the oiling mechanism and the nipple varies from time to time as the nipple is moved. Thus, again the leakage of lubricant is unavoidable.

Accordingly, it is an object of this invention to provide an improved oiling apparatus for continuously moving bodies wherein oiling nipples of the moving bodies and the oiling nozzle of the oiling mechanism are accurately aligned when they are brought into engagement.

Another object of this invention is to provide an improved oiling apparatus for a plurality of continuously and successively moving bodies wherein the oiling mechanism and the moving bodies are moved in exact synchronism during oiling operation.

Still another object of this invention is to provide an improved automatic oiling apparatus for continuously moving bodies wherein the angle of contact between the moving bodies and the oiling mechanism is maintained constant during oiling operation.

Yet another object of this invention is to provide a compact mechanism for feeding a predetermined definite quantity of lubricant to each of a plurality of bodies to be oiled which are moving at a relatively high speed.

According to one embodiment, these and further objects are attained by providing an oiling apparatus comprising a support, means to reciprocate said support substantially in parallel with the path of the continuously moving bodies to be oiled, an oiling mechanism supported by said support and adapted to be advanced and retracted towards and away from said path, a guide member supported by said support, means to advance said guide member towards and away from said path to engage and disengage from said bodies in accordance with the reciprocating motion of said support, and means to operate said oiling mechanism in accordance with the movement of said support.

In a preferred embodiment, the guide means and the oiling mechanism are combined onto a compact unitary structure.

For a more complete understanding of this invention reference may be had to the following detailed description in connection with the accompanying drawings in which.

Figure 1:
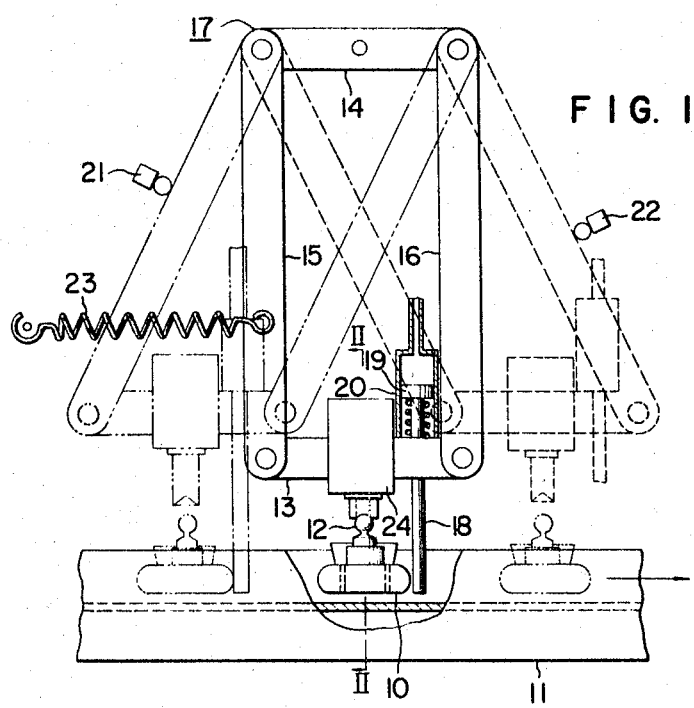
FIG. 1 is a diagrammatic plan view, partly in section, of the novel oiling apparatus.

Referring now to the accompanying drawing, FIG. 1 shows one embodiment of this invention as applied to oiling moving bodies, for example, a plurality of spaced guide rollers 10 mounted on pivots between links of a chain conveyor, not shown, running along a rail 11 in a definite direction shown by an arrow. Each of the rollers 10 is provided with a grease nipple 12 at right angles to the direction of movement. In parallel with the rail 11 there is provided a swinging lever 13 with its opposite ends pivotally connected to the opposite ends of a spaced parallel lever 14 through parallel arms 15 and 16, thus forming a parallelogram mechanism 17. The lever 14 is suitably secured to a stationary member, not shown, so that the lever 13 can swing back and forth substantially in parallel with the rail 11. A guide rod 18 is provided to extend through the lever 13 towards rollers 10, the upper end of the guide rod being connected to a piston 19 housed in a cylinder 20 which is supported by the swinging lever 3. Thus, by the operation of the piston-cylinder assembly the guide rod 18 is reciprocated towards and away from the rollers.

The operation of the piston-cylinder assembly is controlled in a manner to be described later by a pair of limit switches 21 and 22 arranged to limit the width of the swinging motion of the parallelogram mechanism 17. The parallelogram mechanism 17 is provided with a restoring mechanism shown as a spring 23 having one end connected to the arm 15 and the opposite end to a stationary structure, not shown. When the guide rod 18 is retracted or moved upward as described later by the action of the limit switch 22, which is operated when the parallelogram mechanism 17 is moved to the forward position shown by dotted lines, the spring 23 operates to restore the parallelogram mechanism to the rearward position shown by dot and dash lines until it engages the other limit switch 21.

Figure 2:
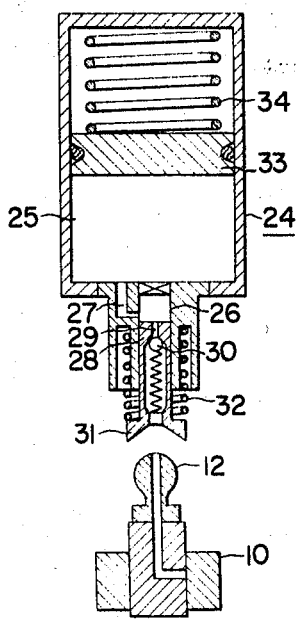
FIG. 2 shows a section taken along a line II—II in FIG. 1.

An oiling mechanism 24 is mounted upon the swinging lever 13 to move therewith. The oiling mechanism may be a so-called push gun, as shown in FIG. 2, and comprises an oil or grease tank 25 secured to the swinging lever 13, a cylinder 26 depending from the bottom wall of the grease tank 25 and communicating therewith through a conduit 27 and a hollow piston 28 slidably received in the cylinder 26. The piston 28 is provided at its upper end with an opening 29 normally closed by a spring biased check valve 30 and an oiling nozzle or socket 31 which is normally biased move away from the nipple 12 of the running roller 10 by means of a helical spring 32. A piston 33 urged by a relatively weak spring 34 is contained in the grease tank 25 to supply grease contained therein in the upper portion of the cylinder bore above the piston 28. The parallelogram mechanism 17 and the oiling mechanism 24 are so designed that the socket 31 engages the nipple 12 and is urged upward thereby during a portion of the forward stroke of the parallelogram mechanism.

The operation of the oiling device is as follows:

When the parallelogram mechanism 17 is retracted to the rearward position indicated by dot and dash lines, the limit switch 21 is operated to introduce fluid under pressure into the cylinder 20 to lower the guide rod 18 into the path of movement of the rollers 10 of the chain conveyor. When the guide rod 18 is caught by one of the rollers, the parallelogram mechanism 17 is swung from left to right, thus lowering the oiling mechanism 24. At a certain point of this forward movement, the socket 31 engages the nipple 12 and thereafter is pushed upward by the downward movement of the oiling mechanism 24 whereby a definite quantity of grease contained in the space above the iston 28 is supplied to the particular roller 10 through the check valve 30 and the nipple 12. The mechanisms are so constructed that this oiling operation will be completed when the oiling mechanism 24 is brought closest to the roller 10 (or the position shown by solid lines in FIG. 1). As the conveyor chain continues to move, the parallelogram mechanism is swung to the forward position indicated by dotted lines until the arm 16 engages the limit switch 22. Then this switch acts to discharge the fluid under pressure from the cylinder 20 to retract the guide rod 18 from the path of movement of rollers 10, thus permitting the spring 23 to restore the parallelogram mechanism to the rearward position indicated by dot and dash lines. During the movement of the parallelogram mechanism from the position shown by solid lines to the position indicated by dotted lines, the oiling mechanism 24 which has finished its oiling operation as above described in raised from its lowerest position to disengage the socket 31 from the nipple 12. Thus, the socket 31 will be moved downward by the spring 32, and new grease will be charged into the space above the cylinder 28 to prepare for the next oiling operation. When actuated by the arm 15, the limit switch 21 operates to again introduce fluid under pressure into the cylinder 20 to project the guide rod 18. In this manner, moving bodies requiring oiling are automatically and successively supplied with lubricant of a definite quantity, thus eliminating troublesome and time consuming manual oiling operation.

Figure 3:
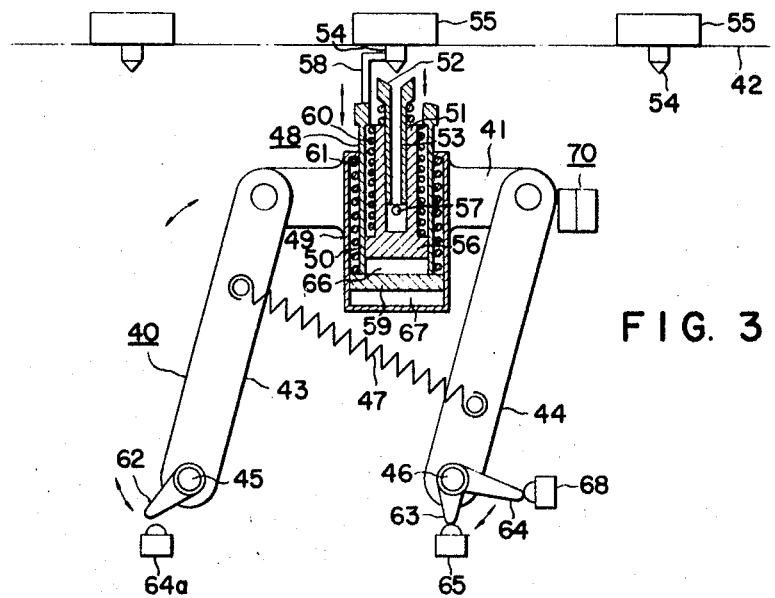
FIG. 3 is a diagrammatic plan view, partly in section, of a modified oiling apparatus.

Turning now to FIG. 3 which shows a modification in which the oiling mechanism and the guide rod operating cylinder shown in FIG. 1 are combined into a compact unitary structure, the parallelogram mechanism 40 is shown as comprising a swinging lever 41 generally disposed in parallel with a conveyor chain 42, schematically illustrated by a dot and dash line, and a pair of parallel arms 43 and 44 pivotally connected to the opposite ends of the lever 41. The other ends of the arms are connected to stationary pivot shafts 45 and 46, respectively, and a restoring spring 47 is connected between arms 43 and 44 at an angle with respect to the swinging arm 41.

The combined oiling mechanism and guide rod operating mechanism 48 comprises three concentric cylinders 49, 50 and 51, a hollow piston 53 slidably received in the inner cylinder 51 and carrying an oiling nozzle or socket 52 adapted to engage oiling nipples 54 of the guide rollers 55 of the chain conveyor 42. The lower end of the cylinder 51 is connected to a piston 56 which is slidably received in the intermediate cylinder 50. The space in the cylinder 51 defined between the lower end of the piston 53 and the upper surface of the piston 56 forms a grease chamber into which a definite quantity of grease is supplied through a port 57. The upper end of the intermediate cylinder 50 is connected to a guide rod 58, while the lower end is connected to a second piston 59 which is slidable in the outer cylinder 49 fixed to the swinging arm 41. A helical spring 60 is positioned in a space between cylinders 50 and 51 to restore the piston 56 and the cylinder 51, and a similar spring 61 is positioned in a space between cylinders 49 and 50 to restore the piston 59, the cylinder 50, and the guide rod 58 carried thereby.

A cam 62 is secured to the lower end of the arm 40 to actuate a valve $64_a$ for exhausting fluid under pressure from chambers 66 and 67 above and below the piston 59. Also, cams 63 and 64 spaced by a predetermined angle are secured to the lower end of the arm 44 to respectively actuate valves 65 and 68 for introducing fluid under pressure in the chambers 67 and 66, respectively.

Figure 4:
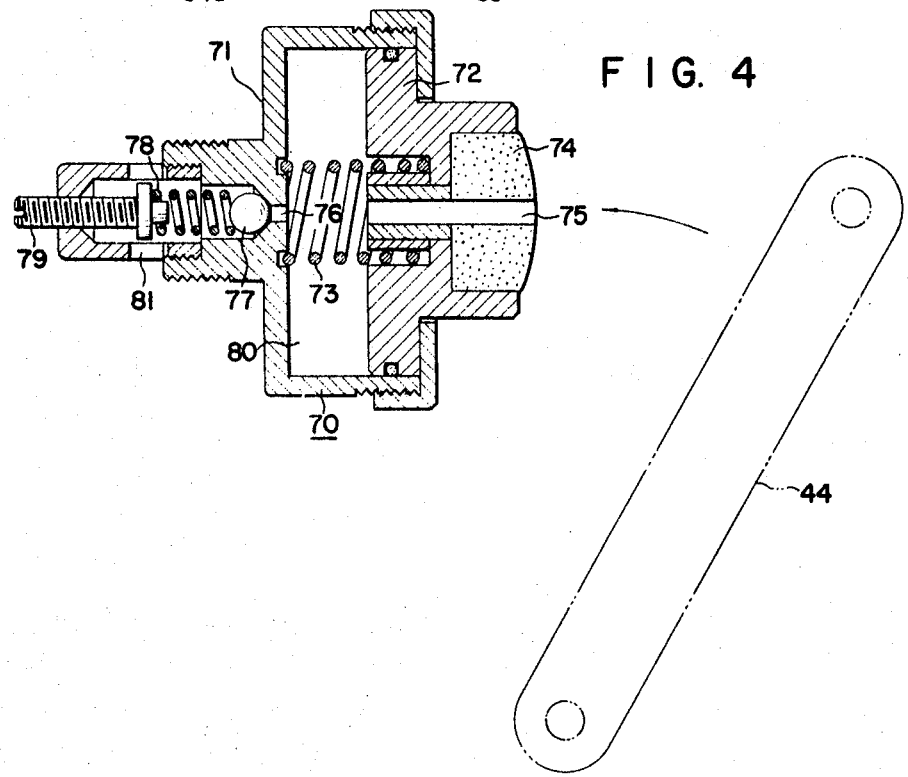
FIG. 4 shows a longitudinal sectional view of the shock absorber utilized in FIG. 3.

A suitable shock absorber or damping device 70 is provided to absorb the mechanical shock which is produced when the parallelogram mechanism 40 is restored to the position shown in FIG. 3. While the shock absorber may be of any suitable type, a preferred construction is shown in FIG. 4 which comprises a cylinder 71, and a piston 72 therein which is normally biased outwardly by means of a compression spring 73. The piston is provided with a resilient seat 74 with which the arm 44 of the parallelogram mechanism engages, and an air passage 75 extending through the piston. The bottom wall of the cylinder is provided with an exhaust port 76 which is normally closed by a check valve 77 biased by a spring 78 which can be adjusted by a screw rod 79. Normally, the space 80 within the cylinder is vented to the atmosphere through the air passage 75 but sealed off when the opening of the passage 75 is closed by the arm 44 when the latter strikes the seat 74 and slightly deforms it. Thereafter the piston 72 is moved to the left, as viewed in FIG. 4, against thte bias of the spring 73, thus compressing the air contained in the air space 80. When the pressure in the air space 80 reaches a predetermined value, the compressed air will be exhausted through the exhaust port 76 and 81 by displacing the check valve 77. In this manner the kinetic energy of the parallelogram mechanism is absorbed without any shock.

The modification shown in FIGS. 3 and 4 operates as follows. It is first assumed that the chain conveyor 42 and its rollers 55 are continuously moving in the direction indicated by an arrow and that the parallelogram mechanism 40 is in its rearward position shown in FIG. 3. In this state, the cam 63 actuates the valve 65 to introduce fluid under pressure, compressed air, for instance, into the chamber 67 to advance the guide rod 58 into the path of the rollers. Then, when the guide rod 58 is engaged by the oiling nipple 54 of one of rollers 55, the parallelogram mechanism begins to rotate in the counterclockwise direction. Immediately thereafter the cam 64 comes to actuate the valve 68 to introduce compressed air into the chamber 66 between pistons 56 and 59 to advance the cylinder 51 and the socket 52 towards the nipple 54. After the socket 52 has engaged the nipple, the piston 56 is still advanced to force out the lubricant or grease contained in the space between pistons 53 and 56 into the nipple. Upon completion of the feeding of a definite quantity of grease the cam 62 comes to engage the exhaust valve 64$_a$ to exhaust the compressed air in chambers 66 and 67 thus disengaging the guide rod 58 and the oiling socket 52 from the nipple. As a result the restoring spring 45 will rotate the parallelogram mechanism 40 in the clockwise direction until it is stopped without shock by the shock absorber 70. Thereafter, identical cycles of operations are repeated for succeeding rollers.

In both of the above described embodiments, since the oiling mechanism is moved in synchronism with the rollers to be oiled by the action of the guide rod, it is able to maintain a firm fit between the nipple and the socket thus assuring positive oiling operation without leakage. Further, as the socket is held coaxially with the nipple by the guide rod at the commencement of the oiling operation, it is possible to accurately interfit them without any shock or damage. Moreover, as the oiling mechanism is carried by the parallelogram mechanism so that it is always maintained at right angles with respect to the moving chain conveyor, which also ensures a firm fit between the nipple and the socket. It will be obvious that any suitable microswitches and electromagnetic valves may be used instead of valves 64, 65 and 68.

Figure 5:
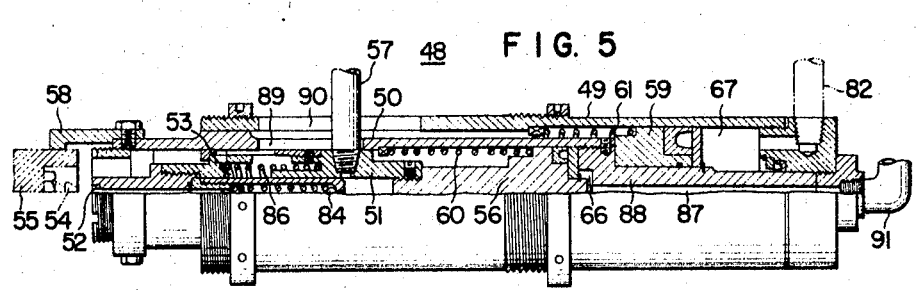
FIG. 5 shows a longitudinal section of a compact oiling mechanism utilized in the apparatus shown in FIG. 4.

FIG. 5 shows a typical preferred construction of the oiling mechanism 48 schematically shown in FIG. 3, so that identical parts are designated by the same reference numerals. More particularly, the intermediate cylinder 50 is resiliently supported in the outer cylinder 49 by the spring 61 and is moved in the forward direction by the piston 59 which is actuated by compressed air introduced into the chamber 67 via a conduit 82 provided at the rear end of the cylinder 49. The guide member or rod 58 is mounted on the outer end of the intermediate cylinder to cooperate with the roller 55. The inner cylinder 51 is slidably disposed in the intermediate cylinder 50, and a cylinder 53 carrying the oiling socket or nozzle 52 is secured to the left hand end of the cylinder, said socket being communicated with the interior of the cylinder 51 via a spring biased check valve 84. The oiling socket 52 is resiliently connected to the cylinder 51 through a spring 86. Air under pressure is introduced into the space 66 behind the piston 56 via a duct 87 extending through a cylindrical member 88 secured to the intermediate cylinder 88 and a pipe 91 connected to the right hand end of the outer cylinder. A grease pipe 57 opening into the grease chamber in the intermediate cylinder 51 extends through axial slots 89 and 90 provided for cylinders 50 and 49, respectively.

Introduction of grease in the cylinder 51, and introduction and exhausting of compressed air in and out of the chambers 66 and 67 are controlled by cams and valves which are identical to those shown in FIG. 3, and the oiling mechanism shown in FIG. 5 operates in the same manner as that shown in FIG. 3.

Thus, it will be clear that the invention provides a novel automatic oiling apparatus for continuously and successively moving bodies or machine parts to be oiled wherein the oiling mechanism is moved synchronously with the bodies and is maintained at a definite angle with respect to the bodies during oiling operation, whereby an accurate and snug fit is assured between the oiling mechanism and the bodies to be oiled.

While the invention has been described by illustrating some preferred embodiments thereof it should be understood that this invention is not limited to these particular embodiments and that many modifications may be made therein without departing from the true spirit and scope of the invention as defined in the appended claims.

What is claimed.

1. Apparatus for oiling elements continuously traveling in a given path of travel comprising, a parallelogram mechanism including a swinging lever disposed parallel with the path of travel of said elements and a pair of parallel arms, one end of each of said arms being connected to opposite ends of said swinging lever, the pair of levers each having other ends pivotally supported on a side of said swinging lever opposite to a side near said path of travel, an oiling mechanism supported on said swinging lever advanced toward and away from said path of travel in accordance with movement of said lever toward and away from said path of travel, a guide member supported by said swinging lever, a cylinder and piston assembly supported on said swinging lever to operate said guide member into engagement with and disengagement from said elements individually, whereby when said guide member engages said traveling elements it causes said parallelogram mechanism to move along with said elements during engagement thereof by said guide member, means located at opposite ends of a path of movement of said swinging lever and actuated by said parallelogram mechanism to operate said piston cylinder assembly, and means to restore said parallelogram to an initial position each time said guide member disengages from each of said elements.

2. Apparatus for oiling elements continuously traveling in a given path of travel according to claim 1, in which said oiling mechanism comprises a lubricant tank, a cylinder communicating with said tank, a lubricant-applying nozzle, a hollow piston supporting said oiling nozzle slidably received in said cylinder, and a check valve contained in said hollow piston.

3. Apparatus according to claim 1, in which said oiling mechanism and said piston cylinder assembly are combined into a unitary structure comprising an outer cylinder, an intermediate cylinder contained in said outer cylinder having a first piston slidably received therein, said intermediate cylinder carrying said guide member, an inner cylinder contained in said intermediate cylinder and including a piston slidably received therein, a hollow piston contained in said inner cylinder and carrying an oiling nozzle at its outer end, said piston and said inner cylinder defining a lubricant chamber of a predetermined definite volume, and a check valve disposed in said hollow piston.

4. Apparatus according to claim 1, in which, a shock absorber is provided to cushion the movement of said parallelogram mechanism, said shock absorber comprising a cylinder, a piston contained therein which is normally urged towards outside of said cylinder, and an exhaust port, a check valve normally closing said exhaust port, said piston being provided with an axial passage communicating the interior of said cylinder with the atmosphere, whereby, when said parallelogram mechanism to be damped engages said shock absorber said axial passage is closed to seal the interior of the cylinder and compresses the air entrapped therein until a predetermined pressure is reached at which said check valve is opened to vent said interior of said cylinder.

References Cited

UNITED STATES PATENTS 1,207,426  12/1916  McNabb _____ 267—34

FOREIGN PATENTS 549,155  11/1942  Great Britain.

HOUSTON S. BELL, JR., Primary Examiner

U.S. Cl. X.R.

267—1